Patented Apr. 25, 1950

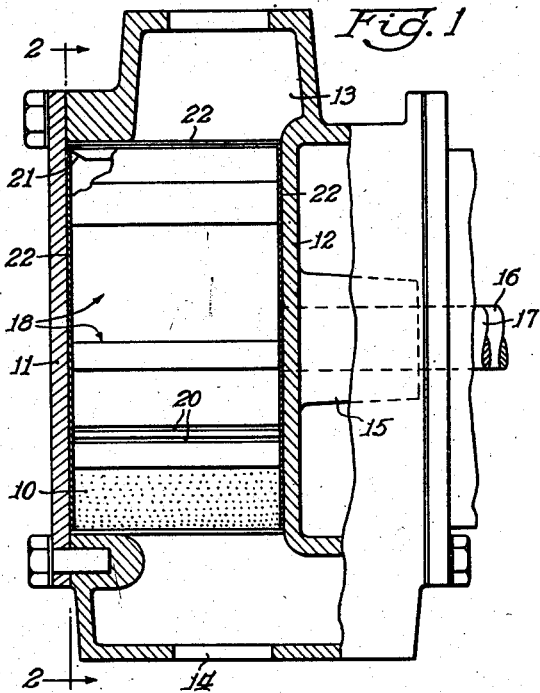
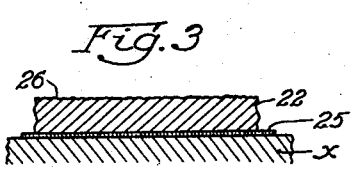
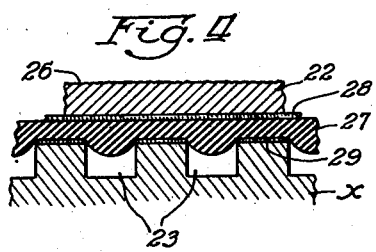
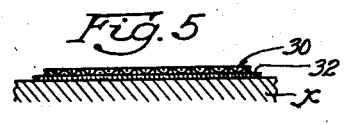
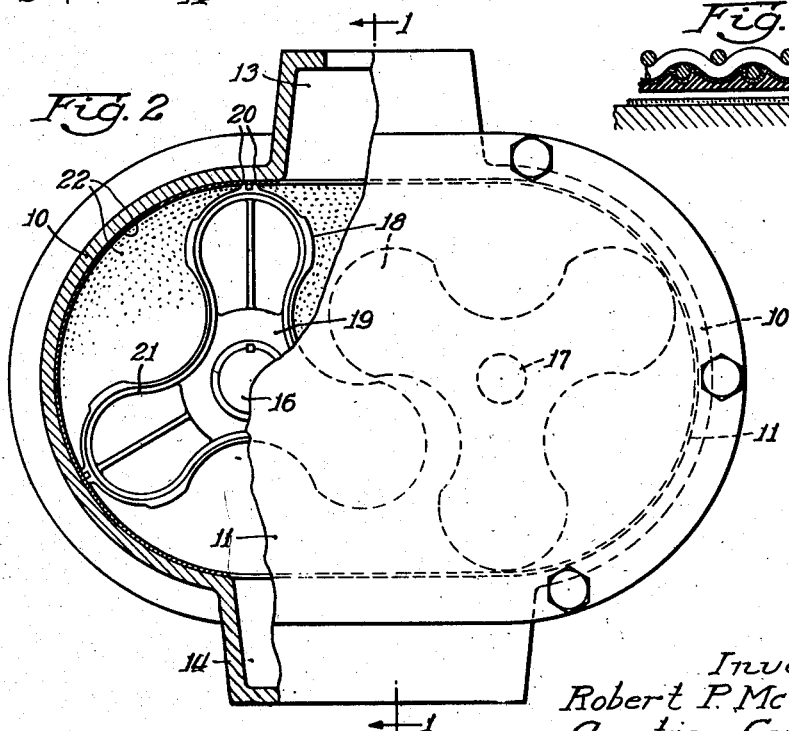

2,505,197

UNITED STATES PATENT OFFICE 2,505,197

PUMP HOUSING

Robert P. McCulloch, Los Angeles, and Austin Gudmundsen, Glendale, Calif., assignors to Borg-Warner Corporation, Chicago, Ill., a corporation of Illinois Original application December 24, 1943, Serial No. 515,574. Divided and this application April 12, 1949, Serial No. 86,912

3 Claims. (Cl. 230—141)

The present invention relates to fluid displacement apparatus, and it has particular reference to structures of this character that are employed for supercharging aircraft engines. The subject matter of this application is a division of the application of Robert P. McCulloch and Austin Gudmundsen, Serial No. 515,574, filed December 24, 1943.

One of the principal objects of the present invention is to simplify the construction of fluid displacement apparatus such as superchargers, and to improve the efficiency, operation and dependability of such apparatus.

An object of the improvements is to materially reduce the weight of the apparatus without affecting the strength of the structural parts or decreasing the efficiency of its operation.

Another object resides in providing a fluid displacement apparatus wherein the housing walls are made of a light-weight metal such as an aluminum alloy, and the work-faces of said walls, that are proximate to the rotors, are provided with a liner that is preferably a steel sheet that is a harder material than the aluminum alloy, and effects a snug fit with respect to the rotor with which the liner is engaged. The liner may be secured in any suitable manner to the work faces of the housing, and the portions of the rotors that coact therewith are provided with ridges or lands. After assembly of the pump, the rotors are operated at a desirable speed to cut or wear away the contacted surface of the rotor. as a result of this arrangement a minimum clearance is effected between the rotor blades or lobes and the liner work face of the housing.

It is a further object of this invention to provide a liner for the work face of the housing that may be conveniently removed whereby to effect ready replacement thereof.

Also it is an object of the present improvements to provide effective means in a supercharger to overcome and prevent a grabbing or "freezing" of the rotors to the work faces when the apparatus is operated at accelerated or abnormal speed, such as required when the aircraft is flying at high altitudes.

Additional objects, aims and advantages of this invention will be apparent to persons skilled in the art after the construction and operation of the apparatus is understood from the within description.

It is preferred to accomplish the numerous objects of this invention and to practice the same substantially in the manner hereinafter fully described and as more particularly pointed out in the appended claims, reference being made to the accompanying drawings that form a part of this specification, wherein:

Fig. 1 is a fragmentary section of a fluid displacement apparatus embodying the improvements contemplated herein, the view being on the plane of line 1—1 on Fig. 2;

Fig. 2 is a vertical section taken on the plane of line 2—2 on Fig. 1;

Fig. 3 is a sectional view on an exaggerated scale showing one of the preferred forms of this invention and a manner of mounting the liner sheet on the housing wall;

Fig. 4 is a view similar to Fig. 3 showing a modified manner of keying the liner to the housing wall;

Fig. 5 is a sectional view showing a liner sheet that comprises a metal screen or mesh; and Fig. 6 is an exploded view of the structure shown in Fig. 5 and drawn to a larger scale.

The drawings are to be understood as being more or less of a schematic character for the purpose of disclosing typical or preferred forms in which the improvements contemplated herein may be made. In these drawings like reference characters identify the same parts wherever they appear in the different views.

The fluid displacement apparatus shown in Figs. 1 and 2 is preferably a supercharger for internal combustion engines, but it will be understood that the improvements are adaptable to other types of apparatus. The housing comprises the arcuate or semi-cylindrical end walls 10, a closure plate 11 for the open side of the housing, and a partition or back wall 12 opposite the open side. The top of the housing is provided with an outlet stub 13 intermediate the semi-cylindrical walls 10, and there is an inlet stub 14 in the bottom of the housing opposite the outlet stub. Spaced parallel bearing bosses 15 that project from the back wall partition 12 provide journals for the shafts 16 and 17 that are rotatably mounted in said bosses so that their outer ends are projected beyond said bosses where they have intermeshed timing gears (not shown) secured to them, and one of said shafts is suitably coupled to a motor or other prime mover that is adapted to actuate the pump.

The rotors, which are preferably of the general shape of the blades of a Roots blower, each comprises a plurality of lobe-shaped members or blades 18 extending radially from a central hub 19 that is anchored to its respective shaft. The outer portions of these blades or lobes 18 that are adapted to sweep the arcuate work faces of the semi-cylindrical walls 10 are preferably provided with parallel lands or ridges 20 that are coextensive with the length of each of the blades and are disposed in spaced relation with respect to each other at the tips of the blades. The lobes or blades 18 are preferably of hollow construction with reinforcing ribs to strengthen them, and the marginal edges of the lobe walls are preferably reduced in thickness by chamfering or under-cutting them as indicated at 21. This provides a relatively narrow chisel-like shape for these work edges of the lobes or blades.

For the purpose of reducing the weight of the pump, the housing and the rotors may be fabricated from a light-weight metal such as an aluminum alloy. This material, however, does not provide a sufficiently hard work face for the housing walls and it is not dependable in maintaining a minimum clearance between the working parts of a supercharger. To overcome these disadvantages, the work faces of the housing walls are provided with a liner 22 that comprises a thin sheet of material that is harder than the aluminum alloy of the housing walls. It will be understood that the work faces of the housing are the inner surfaces of the semi-cylindrical walls 10, the inside surface of the cover plate 11, and the surface of the partition or back wall 12, all of which surfaces are swept by the rotors during operation of the pump. This liner is detachably mounted on the aforesaid surfaces of the housing in a manner that permits its ready removal and replacement whenever desired. A variety of types of these liners and attaching means are disclosed in Figs. 3, 4, 5 and 6.

In Fig. 3 the housing wall, that is hereinafter identified as $x$, may be any of the housing walls that has a work face adapted to be swept by the rotor. The liner 22 is a comparatively thin sheet of hard material such as steel, and said liner sheet is attached to the housing wall by means of a layer 25 of a commercial cement known under the trade-name of "Cycle-Weld" that is manufactured and distributed by Cycleweld Division, Chrysler Motors Company, Detroit, Michigan. This cementitious material is applied to the surfaces to be united preferably in a plastic state and it is allowed to set while the metal sheet 22 is being pressed firmly against the housing wall.

The inner or exposed surface of the liner sheet 22 may be roughened as shown at 26 in Fig. 3 by blasting the surface with grit. After the parts of the pump are thus assembled, with practically no clearance between the rotors and the liner work faces of the housing walls, the pump is operated at normal speed which will effect an expansion of the parts due to the generated heat, and during this initial running of the pump the ridges or lands 20 and the undercut edges 21 of the rotor walls will be dressed down and will wear away a portion of the roughened work faces of the liners 22, so that the desired minimum clearances are obtained between the respective working parts of the pump.

In the type of assembly shown in Fig. 4, the housing wall $x$ is provided with a plurality of channels or grooves 23, and the liner 22 is a comparatively thin sheet of hard metal such as steel. The liner sheet 22 is cemented to the housing wall with an intermediate layer 27 interposed between them. This intermediate layer is preferably a material such as neoprene or the like that has the soft and flexible characteristics of rubber and it is applied in a somewhat plastic state. In this instance the coating of cement 28 is applied to the back of the liner sheet 22 and a similar cement coating 29 is also applied to the ridges between the channels or grooves 23 in the housing wall $x$. A suitable cement for this purpose is a commercial product manufactured and distributed under the trade-name "Ty-Ply" by Marbon Corporation of Gary, Indiana, and it is applied in a liquid or semi-liquid state upon the parts to be assembled. When the components of the assembly are pressed together and heated to cure the neoprene the excess of the neoprene sheet 27 will bulge into the channels or grooves 23 in the housing wall and key the parts together in an effective manner.

In lieu of the metal sheet liner 22 hereinbefore described, the liner sheet may comprise a metal screen 30 that is formed by intermeshed or woven steel strips or steel wires as shown in Figs. 5 and 6. In applying this type of mesh or screen liner 30 to the housing wall $x$ the surfaces of these parts which oppose each other are sprayed with the "Ty-Ply" cement to provide a film 31 thereof on the under surface of the screen 30 and a film 32 of this cement upon the surface of the housing wall $x$ to which the liner is to be united. A ply of neoprene 33 is interposed between the thus prepared liner and housing wall and the assembled structure subjected to heat and pressure to cure the neoprene and unite the parts. A fiber mat, such as a Masonite board, is placed on the outer surface of the screen prior to the curing operation so that when the pressure is applied the mat will be forced into the interstices of the wire mesh and confine the neoprene back of the outer surface of this liner sheet. The metal mesh or screen provides a rough outer surface having the characteristics of the grit-blasted surface shown in Fig. 1. This exposed rough surface of the mesh liner 30 may be worn down or dressed in the manner above described with reference to the grit blasted surface of the sheet metal liner.

While this invention has been described in detail in its present preferred forms or embodiments, it will be apparent to persons skilled in the art, after understanding the improvements contemplated herein, that various changes and modifications may be made therein without departing from the spirit or scope thereof. It is aimed in the appended claims to cover all such changes and modifications.

It is claimed:

1. In a fluid displacement apparatus, a housing comprising a plurality of walls having faces provided with a plurality of channels; a rotor in said housing; liners on the channeled faces of the housing walls, said rotor and liners initially engaging with no clearance therebetween, each liner comprising a sheet that is harder than the material of said rotor and having a grit-blasted abrading work face effective to dress down the engaged surface of the rotor; and an intermediate attaching ply between said walls and liners and comprising a material different therefrom and keyed into said channels.

2. A supercharger, comprising: a housing including opposed side wall portions and arcuate end wall portions defining a rotor chamber, said side and end wall portions having surfaces provided with a plurality of channels; said housing having a fluid inlet and a fluid outlet port provided therein, each port communicating with said rotor chamber, liners on the channeled surfaces of said housing walls, each liner comprising a sheet that is harder than the material of said rotor and having an inner grit-blasted abrading surface; an intermediate attaching ply between said walls and liners and comprising a material different therefrom and keyed into said channels; a pair of meshing rotor members, said rotor members and abrading surfaces initially being in frictional contact with no clearance therebetween, and said rotors having a hardness less than the hardness of said liner plates, whereby upon initial rotation of said rotor members relative to said abrading surfaces, said rotor members will be automatically dressed down by said abrading surfaces to provide working clearance.

3. A supercharger, comprising: a housing including opposed side wall portions and arcuate end wall portions defining a rotor chamber; liner means disposed inwardly of said side and end wall portions, respectively, said liner means comprising metal liner plates provided with grit-blasted abrading surfaces; means securing said liner plates to said housing including a ply of resilient material disposed between the outer surface of said liner plates and said side and end wall portions and cementitious material securing said resilient ply to both said wall portions and said liner plates; and a pair of rotor members in said chamber, each of said rotor members having a plurality of blades, and the blades of said rotor members intermeshing, said rotor members and abrading surfaces initially being in frictional contact with no clearance therebetween and said blades having a hardness less than the hardness of said liner plates, whereby upon initial rotation of said rotor members relative to said abrading surfaces the outermost peripheral portion and end faces of said blades will be automatically dressed down by said abrading surfaces to provide working clearance.

ROBERT P. McCULLOCH.
AUSTIN GUDMUNDSEN.

REFERENCES CITED

The following references are of record in the file of this patent:

UNITED STATES PATENTS

| Number | Name | Date |
|---|---|---|
| 878,480 | Green | July 16, 1901 |
| 1,158,733 | Shepherd et al. | Nov. 2, 1915 |
| 1,631,359 | Brown | June 7, 1927 |
| 1,681,796 | Wendell | Aug. 21, 1928 |
| 1,686,867 | Kuhn | Oct. 9, 1928 |
| 1,784,866 | Fahrenwald | Dec. 16, 1930 |
| 1,785,386 | McIntyre | Dec. 16, 1930 |
| 1,828,409 | Densmore | Oct. 20, 1931 |
| 1,837,446 | Kauffman | Dec. 22, 1931 |
| 1,952,179 | Milkowski et al. | Mar. 27, 1934 |
| 2,107,260 | Ihara | Feb. 1, 1938 |
| 2,121,068 | Buechler | June 21, 1938 |
| 2,167,311 | Postma | July 25, 1939 |
| 2,240,121 | Patterson | Apr. 29, 1941 |
| 2,345,975 | Herman | Apr. 4, 1944 |

FOREIGN PATENTS

| Number | Country | Date |
|---|---|---|
| 207,907 | Switzerland | Apr. 1, 1940 |
| 464,475 | Great Britain | Apr. 16, 1937 |